May 10, 1966 G. W. MORGAN 3,250,352
UNIDIRECTIONAL MOTION TRANSMITTING DEVICE
Filed June 1, 1964 2 Sheets-Sheet 1

INVENTOR.
GLEN W. MORGAN
BY Arthur H. Serrell
ATTORNEY

May 10, 1966 G. W. MORGAN 3,250,352
UNIDIRECTIONAL MOTION TRANSMITTING DEVICE
Filed June 1, 1964 2 Sheets-Sheet 2
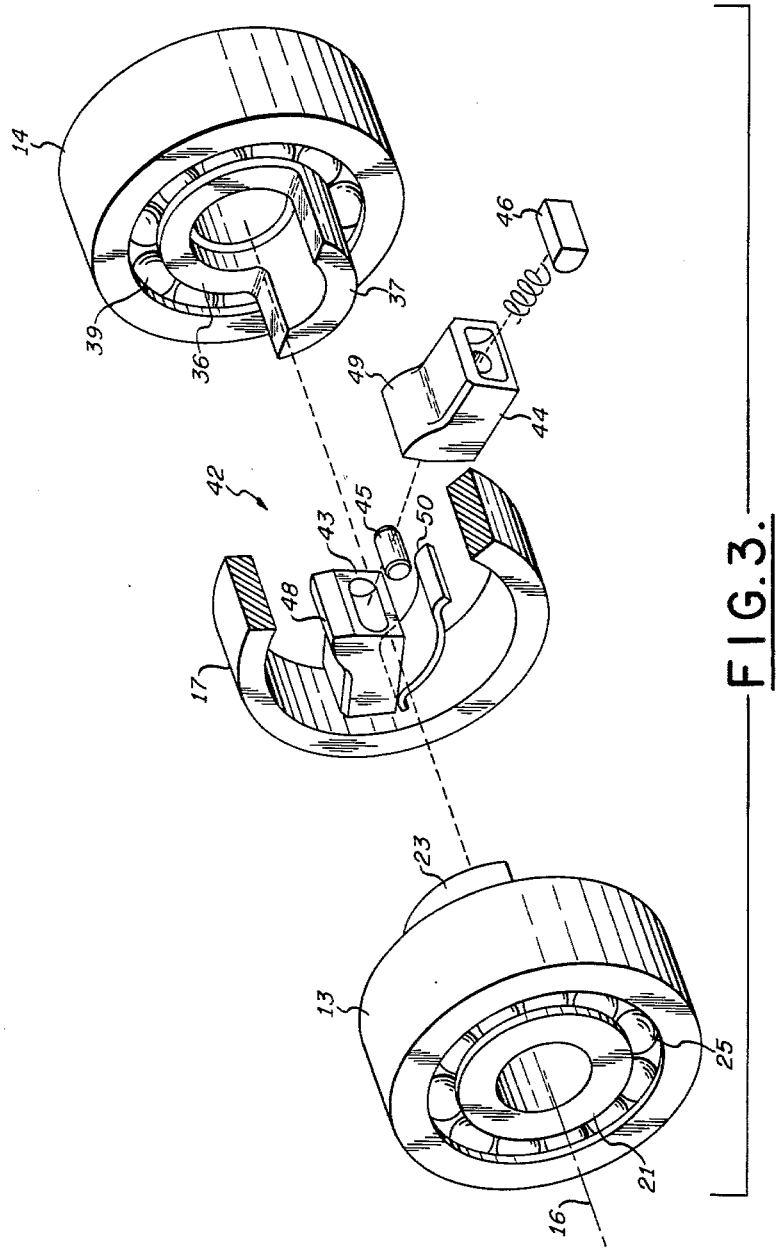
INVENTOR.
GLEN W. MORGAN
BY
Arthur H. Serrell
ATTORNEY

United States Patent Office 3,250,352
Patented May 10, 1966

3,250,352
UNIDIRECTIONAL MOTION TRANSMITTING
DEVICE
Glen W. Morgan, Salt Lake City, Utah, assignor to
Sperry Rand Corporation, Sperry Gyroscope Company
Division, Great Neck, N.Y., a corporation of Delaware
Filed June 1, 1964, Ser. No. 371,412
3 Claims. (Cl. 192—8)

This invention relates to a mechanism having a stationary fastening element, movable driving and load members and a toggle device that locks the load member to the fastening element in one of its operating modes and couples the driving member to the load member unidirectionally in its other operating mode. The mechanism operates in the coupling mode when the input torque of the driving member is greater than the opposing torque of the load member. The mechanism operates in the locking mode when the input torque of the driving member is less than the opposing torque of the load member or in the absence of an input.

The primary object of the present invention is to provide a unidirectional mechanism of the character described having no followback to the driving member from the load member and when the driving member is movable about an axis in both clockwise and counterclockwise directions with the load member.

One of the features of the invention resides in the provision of a mechanism of the character described with a toggle device that automatically changes its condition of operation from one locking the load member to a stationary element to one coupling the member to the driving member and vice versa depending on the respective magnitudes of the input driving torque and the opposing load torque.

Other objects, features and structural details of the invention will become apparent from the following description of the mechanism in connection with the accompanying drawings in which:

FIG. 3 is an exploded perspective of the components of the improved mechanism.

Figure 1:
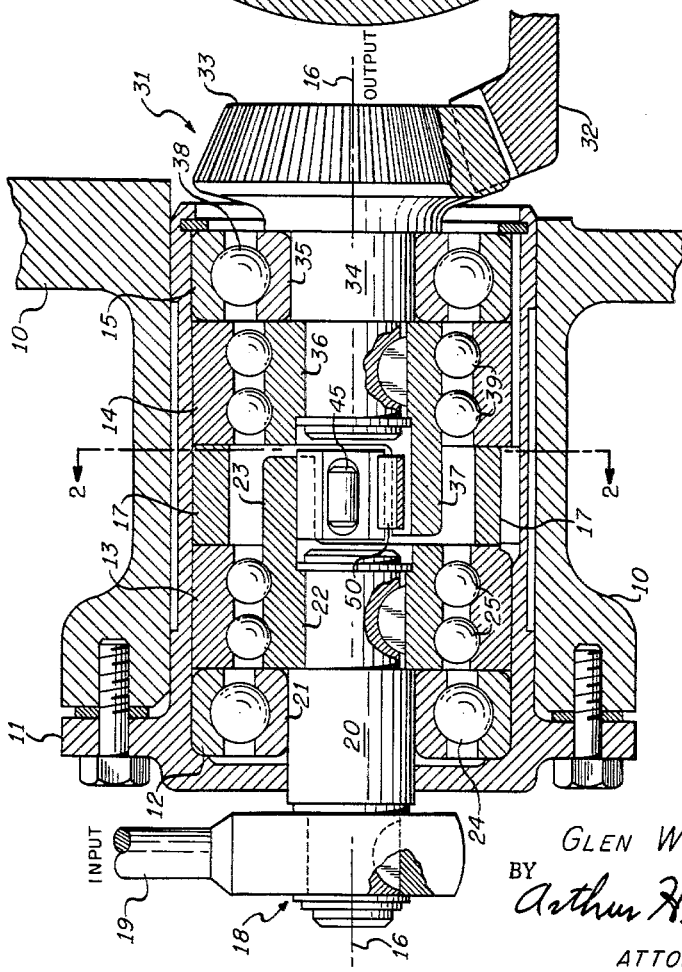
FIG. 1 is a diametrical cross sectional view of a mechanical assembly including the improved mechanism taken along its longitudinal axis.

As shown in FIG. 1, the improved mechanism includes a stationary element or fixed frame 10 with an internal bearing sleeve 11 fixedly connected thereto with outer races 12, 13, 14 and 15 providing an axis 16. A ring 17 with a cylindrical bore whose longitudinal axis corresponds with axis 16 is fixed to element 10 to provide the dog of the mechanism. The frictional surface of the dog 17 is provided by its internal wall which is symmetrical to the axis 16.

The torque input or driving member of the improved mechanism indicated at 18 is an assembly that includes a crank 19, a shaft 20, an inner race 21 for the race 12, and a sleeve 22 providing the inner race for the race 13 having an axially extending portion 23 that cooperates with the ring 17 and a toggle device in a manner hereinafter described. Ball bearings 24 between the races 12, 21 and ball bearings 25 between the race 13 and sleeve 22 mount the driving member 18 on element or frame 10 to move about the axis 16 of the mechanism. Portion 23 of the driving member 18 provides a bifurcated jaw with respective end walls 26 and 27, in FIG. 2. In the operation of the mechanism, jaw wall 27 moves in a counterclockwise direction as indicated by the arrow 28, in FIG. 2, to transmit counterclockwise torque about axis 16. With clockwise motion of member 18 about axis 16, the jaw wall 26 moves in a clockwise direction as indicated by the arrow 29, in FIG. 2, to transmit clockwise torque about axis 16. The extended portion 23 of the sleeve 22 of input torque member 18 further includes a curved cam face 30 between the jaw end walls 26 and 27 that is symmetrical to the axis 16.

Figure 2:
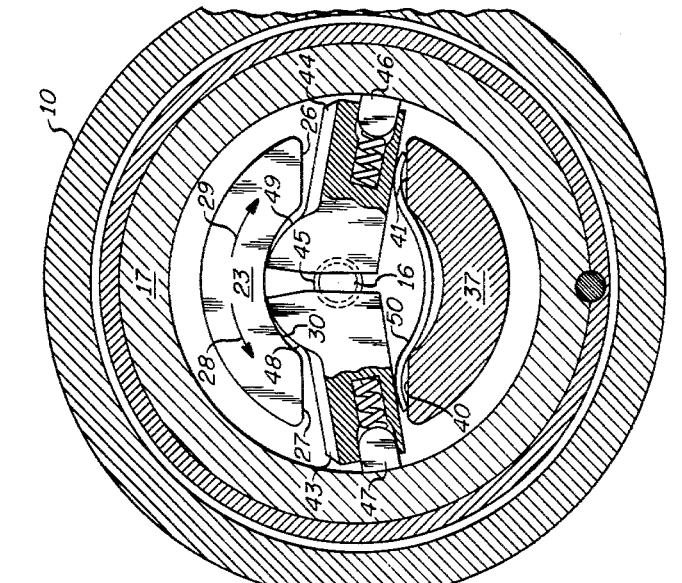
FIG. 2 is a sectional view taken on line 2—2, in FIG. 1.

The torque output or load member of the improved mechanism indicated at 31 is an assembly movably mounted in fixed frame 10 that includes load gear 32, and gear 33 meshing with gear 32 that is mounted to move about the axis 16 of the stationary element or fixed frame 10. As shown in FIG. 1, gear 33 includes a shaft 34, an inner race 35 for the race 15, and a sleeve 36 providing the inner race for the race 14 having an axially extending jaw portion 37 that cooperates with the ring 17, member 18 and a toggle device in a manner hereinafter described. The load member 31 is mounted on the frame 10 to move about axis 16 by ball bearings 38 between the races 15 and 35 and ball bearings 39 between the sleeve 36 and race 14. As shown in FIG. 2, the load sleeve part 37 has the bifurcate jaw configuration of the sleeve part 37 and includes an end wall 40 disposed in cooperable relation to the counterclockwise jaw 27 as well as an end wall 41 disposed in cooperable relation to the clockwise jaw 26.

The means for coupling the driving and load members and for locking the load member to the fastening frame, or dog 10 at ring 17 includes a biased toggle device indicated at 42 in FIG. 3. Device 42 includes two arms 43, 44 of equal length with joined ends pivoted eccentrically to the axis by a connecting pin 45. The opposed ends of the arms 43, 44 include spring biased shoes such as indicated at 46 and 47 that frictionally engage the internal wall of the ring 17 as shown in FIG. 2. Arm 43 of the toggle connection between the parts further includes a cam follower 48 that engages the curved cam face 30 of the input torque jaw part 23. The arm 44 of the toggle also includes a corresponding cam follower 49 that engages the cam face 30 of the part 23. In the absence of an input torque to the mechanism from member 18, as shown in FIG. 2, the arms of the toggle device are biased in spaced condition by an elliptical spring 50, one of whose ends is between jaw 40 and arm 43 and the other of whose ends is between jaw 41 and the arm 44. The shoes 46, 47 of the respective spread arms 44, 43 frictionally engage the ring 17 and lock the member 31 with relation to the stationary element or fixed frame 10.

In the mode coupling the members 19 and 31 free of the stationary element 10 in a counterclockwise direction in FIG. 2, arm 43 of the toggle is released by motion of the input member 18 in the direction of the arrow 28. Here, wall 27 of member 18 engages the arm 43 and the jaw wall 40 of load member 31 to effect motion about axis 16 with shoe 47 sliding along the wall of the ring 17. Motion in the clockwise direction about axis 16, in FIG. 2, is similarly effected by moving member 18 in the direction of arrow 29 to engage the wall 26 of portion 23 with the toggle arm 44 and the wall 41 of the portion 37 of the load member 31 to move the member clockwise about axis 16 with the shoe 46 sliding along the wall of the ring 17. The driving and load members of the mechanism are coupled when the input torque of the drive member exceeds the opposing torque of the load member. The pin 45 permits independent movement of the toggle arms 43 and 44 which operate to restore the mechanism to a locking mode when the input torque to the drive member is less than the opposing torque of the load member. This condition exists in the absence of an input torque and in operations where the torque of the load exceeds the input torque and is in the same direction as the input torque.

The improved mechanism transmits motion unidirectionally from the driving member to the load member and locks the load member to a stationary element to prevent feedback to the driving member.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:
1. A mechanism including,
   a dog having a longitudinal axis and an internal wall symmetrical to the axis,
   a driving member mounted on the dog to move about the axis having a bifurcate jaw with an end wall for transmitting clockwise torque, an end wall for transmitting counterclockwise torque, and a curved cam face between the end walls concentric to the axis,
   a load member mounted on the dog to move about the axis having a bifurcate jaw with end walls disposed in cooperable relation to the respective end walls of the jaw of the driving member,
   means for coupling the driving and load members and for locking the load member to the dog including a toggle having two arms of equal length with joined ends pivoted eccentrically to the axis having respective cam followers engaging the cam face of the driving member and opposed ends frictionally engaging the wall of the dog, and means for connecting the respective arms of the toggle and the end walls of the load member in biasing relation.

2. A mechanism of the character claimed in claim 1 in which the connecting means is an elliptical spring with spread ends, one of the ends of the spring is between one of the toggle arms and one of the end walls of the jaw, and the other of the ends of the spring is between the other of the toggle arms and the other of the end walls of the jaw.

3. A mechanism of the character claimed in claim 1 in which the wall of the dog is cylindrical and concentric to the axis of the driving and load members.

References Cited by the Examiner
UNITED STATES PATENTS 2,371,442   3/1945   Hammond _____ 192—8
2,995,225   8/1961   Cline _____ 192—8

DAVID J. WILLIAMOWSKY, *Primary Examiner.*